United States Patent [19]
Brown et al.

[11] Patent Number: 5,767,738
[45] Date of Patent: Jun. 16, 1998

[54] APPARATUS AND METHOD FOR DEMODULATING A MODULATED SIGNAL

[75] Inventors: Tyler A. Brown, Schaumburg; Dennis J. Thompson, Geneva; Fuyun Ling, Hoffman Estates, all of Ill.

[73] Assignee: Motorola, Inc., Schaumburg, Ill.

[21] Appl. No.: 734,225

[22] Filed: Oct. 21, 1996

[51] Int. Cl.$^6$ ............................ H03D 3/00; H04L 27/22
[52] U.S. Cl. ............ 329/304; 329/316; 375/329; 375/200; 455/133
[58] Field of Search ............ 329/300, 304–310, 329/316–317; 375/200, 208, 285, 320, 322, 324, 325, 329, 346; 455/132–136, 140, 141

[56] References Cited

U.S. PATENT DOCUMENTS 5,214,391  5/1993  Serizawa et al. ............ 329/316

*Primary Examiner*—David Mis
*Attorney, Agent, or Firm*—Richard A. Sonnentag

[57] ABSTRACT

A receiver (156) includes both a coherent and noncoherent demodulator. When the confidence that estimates of the channel is high, the coherent demodulator is implemented. When the confidence that estimates of the channel is low, the noncoherent demodulator is implemented. A controlling microprocessor (162) controls the selection process and also provides a signal (158) to enable the noncoherent demodulator in instances when noncoherent demodulation would most likely be better than coherent demodulation. As an example, such an instance would be immediately after handoff of a mobile station (505) from a source base-station (503) to a target base-station (502).

14 Claims, 5 Drawing Sheets

APPARATUS AND METHOD FOR DEMODULATING A MODULATED SIGNAL

FIELD OF THE INVENTION

The invention relates generally to demodulating signals, and more specifically to demodulating modulated signals in a wireless communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

One type of communication system is a spread-spectrum system. In a spread-spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread-spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread-spectrum communication techniques exist, including direct sequence modulation, frequency and/or time hopping modulation, and chirp modulation. In direct sequence modulation, a carrier signal is modulated by a digital code sequence whose bit rate is much higher than the information signal bandwidth.

Information (i.e., the message signal consisting of voice and/or data) can be embedded in the direct sequence spread-spectrum signal by several methods. One method is to add the information to the spreading code before it is used for spreading modulation. It will be noted that the information being sent must be in a digital form prior to adding it to the spreading code, because the combination of the spreading code and the information typically a binary code involves modulo-2 addition. Alternatively, the information or message signal may be used to modulate a carrier before spreading it.

These direct sequence spread-spectrum communication systems can readily be designed as multiple access communication systems. For example, a spread-spectrum system may be designed as a direct sequence code division multiple access (DS-CDMA) system. In a DS-CDMA system, communication between two communication stations is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is low (i.e., approximately zero).

Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are de-emphasized.

It will be appreciated by those skilled in the art that several different spreading codes exist which can be used to separate data signals from one another in a DS-CDMA communication system. These spreading codes include but are not limited to pseudonoise (PN) codes and Walsh codes. A Walsh code corresponds to a single row or column of the Hadamard matrix.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the required signal to noise ratio (usually expressed as bit energy per noise density i.e., $E_b/N_0$ which is defined as the ratio of energy per information-bit to noise-spectral density), to recover the signal at the cost of expending more bandwidth than would otherwise be necessary to transmit the data signal. For example, Walsh codes can be used to channel code a data signal prior to modulation of the data signal for subsequent transmission. Similarly PN spreading codes can be used to channel code a data signal.

However, channel coding alone may not provide the required signal to noise ratio for some communication system designs which require the system to be able to handle a particular number of simultaneous communications (all having a minimum signal to noise ratio). This design constraint may be satisfied, in some instances, by designing the communication system to coherently detect transmitted signals rather than using noncoherent reception techniques. In coherent detection systems, the channel response is determined so that the affects of phase and magnitude distortions caused by the communication channel can be compensated for with matched filters. In contrast, noncoherent detection systems typically do not compensate for the phase distortion in a received signal which was caused by the communication channel. It will be appreciated by those skilled in the art that a coherent receiver requires less signal to noise ratio (in $E_b/N_0$) than that required by a noncoherent receiver having the same bit error rate (i.e., a particular design constraint denoting an acceptable interference level). Roughly speaking, there is a three deciBel (dB) difference between them for the static channel and even greater for the Rayleigh fading channels. The advantage of the coherent receiver is more significant when diversity reception is used, because there is no combining loss for an optimal coherent receiver while there is always a combining loss for noncoherent receiver.

One such method for facilitating coherent detection of transmitted signals is to use a pilot signal. For example, in a cellular communication system the forward channel, or down-link, (i.e., from base-station to mobile unit) may be coherently detected if the base-station transmits a pilot signal. Subsequently, all the mobile stations use the pilot channel signal to estimate the channel phase and magnitude parameters. However, for the reverse channel, or up-link, (i.e., from mobile to base-station), using such a common pilot signal is not feasible. In this scenario, an estimate of the channel response needs to be made in an attempt to determine the transmitted information.

The superiority of coherent over noncoherent detection is however contingent upon having an accurate estimate of the channel response during each received symbol. Those of ordinary skill in the art recognize that accurate channel estimation requires that the channel vary little over the period of estimation. As a result, estimates of channels which are nearly constant over only short periods of time tend to be poor. Using these poor estimates to perform coherent detection actually yields worse performance that noncoherent detection.

It is common for communication channels to have periods where their channel responses undergo rapid variations. An example is when the frequency oscillators of the transmitter and receiver which are used to perform modulation and demodulation respectively have slightly different frequencies. In this case, the channel phase rotates at a rate equal to the difference of the oscillator frequencies. This channel rotation can be compensated for with an automatic frequency control circuit. However this circuit requires an interval of time termed the frequency acquisition time to become effective and therefore there is a period of time where the channel phase rotates at a rate which may be too great to allow accurate estimation.

This phenomenon is particularly important in cellular telephony where a mobile station can be handed off to one or more base-stations. Once the handoff is initiated, the destination base-station receiver's automatic frequency control circuit begins to compensate for the difference between its own oscillator frequency and that of the mobile station's. During each of these frequency acquisition periods, the channel phase can not be reliably estimated and a prior art receiver which incorporates coherent detection will perform poorly. A similar situation occurs when, due to constructive and destructive interference of multiply reflected waves, the effective frequency of the carrier wave changes rapidly. This may occur, for example, when the mobile station's transmitter is moving with high speed through an area with a large number of scattering surfaces. This action manifests itself as a random, rapidly varying channel response which again precludes accurate estimation.

Coherent detection, while superior to noncoherent detection in bit error rate performance, is therefore susceptible to channels which change too rapidly to permit accurate estimation. Performance of coherent detection without accurate channel estimates can degrade to a level even lower than that of noncoherent demodulation. Therefore a need exits for an improved method and apparatus for demodulating a modulated signal.

DETAILED DESCRIPTION OF THE PREFERRED EMBODIMENT

Figure 1:
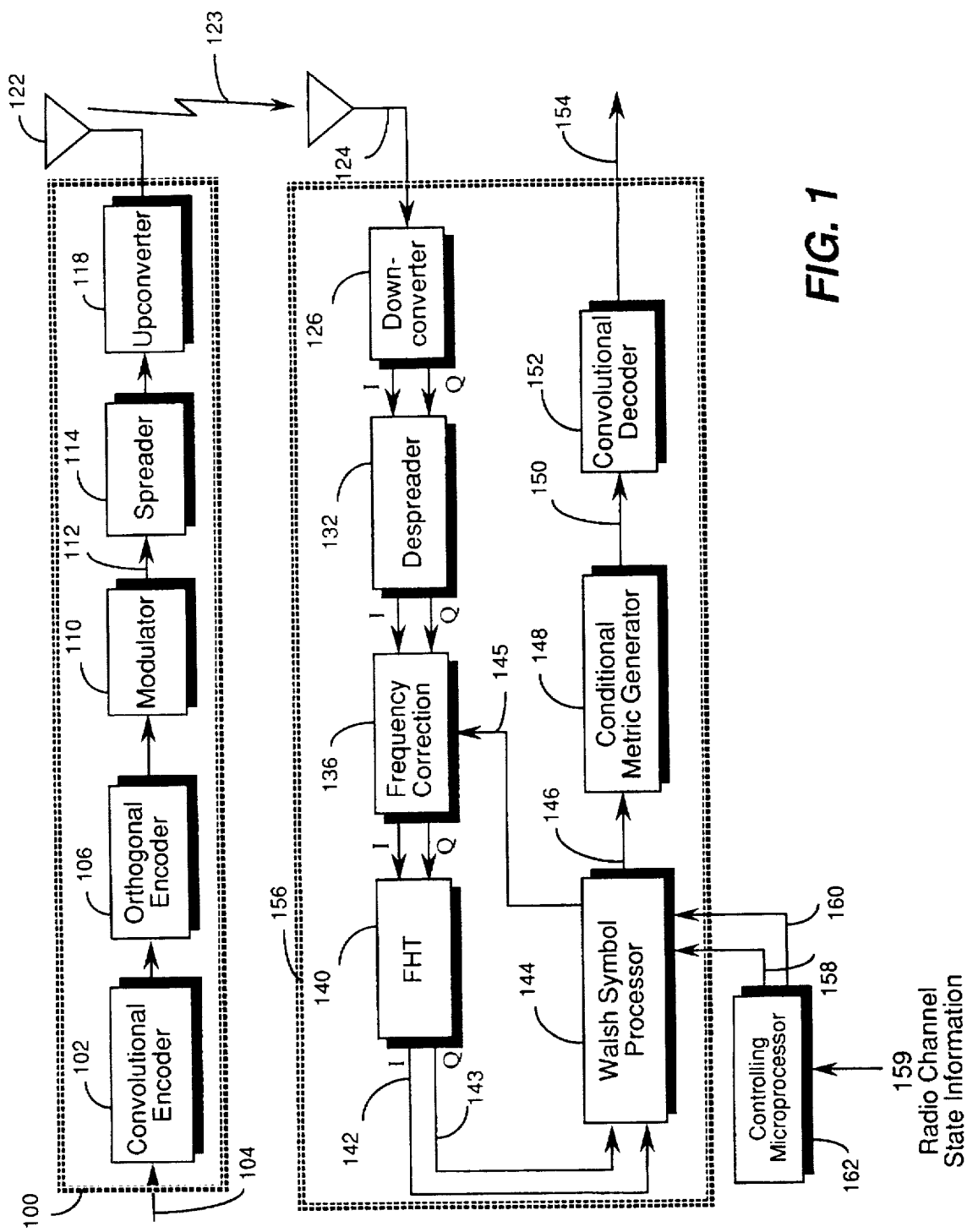
FIG. 1 generally depicts, in block diagram form, a transmitter and a receiver compatible with a wireless communication system in accordance with the invention.

Stated generally, a receiver includes both a coherent and noncoherent demodulator. When the confidence in the channel estimates is high, the coherent demodulator is implemented. When the confidence in the channel estimates is low, the noncoherent demodulator is implemented. A controlling microprocessor controls the selection process and also provides a signal to enable the noncoherent demodulator in instances when noncoherent demodulation would most likely be better than coherent demodulation, such as immediately after handoff of a mobile station from a source base-station to a target base-station.

Stated specifically, an apparatus for demodulating a modulated signal comprises a coherent demodulator having as input a version of the modulated signal and a noncoherent demodulator also having as input the version of the modulated signal. To select between the two demodulators, the apparatus also includes a selector for selecting between the coherent demodulator and the noncoherent demodulator based on the status of a detection mode select signal.

In the preferred embodiment, the modulated signal is an orthogonally modulated signal and the version of the modulated signal comprises an in-phase (I) component and a quadrature (Q) component of the orthogonally modulated signal. Also in the preferred embodiment, the status of the detection mode select signal is generated by comparing an estimate of a variance of the frequency offset to a threshold. The apparatus is employed in a receiver compatible with a code division multiple access (CDMA) wireless communication system.

Also in the preferred embodiment, the estimate of the variance of the frequency offset is generated utilizing a plurality of delay elements to delay a baseband frequency offset estimate and a first summing node for summing an output of each of the plurality of delay elements, producing a first summing node output signal. A squarer squares the summed output signal to produce a squared summed output signal. A plurality of squarers square each of the outputs of the plurality of delay elements to produce a plurality of squared outputs, and a second summing node sums the plurality of squared outputs of the plurality of squarers to produce a second summing node output signal. A bit shifter shifts the second summing node output signal by a predetermined number of bits to produce a bit-shifted signal and a third summing node is implemented so that the squared summed output signal is subtracted from the bit-shifted signal to produce the estimate of the variance of the frequency offset.

Additionally, the threshold is controlled by a microprocessor. The microprocessor controls the selection of either the coherent demodulator or the noncoherent demodulator based on information related to the state of the radio channel. In the preferred embodiment, the state of the radio channel comprises an elapsed time after a communication initiation or an occurrence of a communication handoff in the CDMA wireless communication system, but other states of the radio channel are contemplated.

To demodulate a modulated signal in a wireless communication system, the receiver generates a first estimate of the modulated signal and a second estimate of the modulated signal, and compares the first and second estimates to determine a confidence indication related to the accuracy of the estimates. The receiver then generates a detection mode select signal utilizing either the first estimate or the second estimate based on the confidence indication. Based on the generated detection mode select signal, the receiver then selects either a coherent demodulator or a noncoherent demodulator to employ for demodulation. In this embodiment, the first estimate of the modulated signal is generated by a coherent channel estimator and the second estimate of the modulated signal is generated by a noncoherent Walsh symbol estimator.

FIG. 1 generally depicts a transmitter 100 and a receiver 156 compatible with a wireless communication system. In the preferred embodiment, the wireless communication system is a code division multiple access (CDMA) cellular radiotelephone system and the signalling scheme is that of Interim Standard-95 (IS-95). For more information on IS-95, see TIA/EIA/IS-95, *Mobile Station-Base-station Compatibility Standard for Dual Mode Wideband Spread Spectrum Cellular System*, July 1993. As one of ordinary skill in the art will appreciate from the discussion below, the invention may be applied in any wireless communication system which implements orthogonally encoded digital signals.

Referring to FIG. 1, binary data bits 104 are fed to the transmitter 100 where they are convolutionally encoded by the convolutional encoder 102 and then orthogonally encoded by an orthogonal encoder 106. In the preferred embodiment, groups of six bits are used to select one of 64 Walsh functions. The index of a selected Walsh function is applied to the modulator 110 which generates a 64 element sequence of binary, (+1,−1) data bits 112 corresponding to the selected Walsh function. The resulting signal is fed to a spreader 114 where in-phase (I) and quadrature (Q) digital signals are multiplied by pseudorandom sequences as is well known in the art. This has the effect of spreading the narrowband input signals' energy over a relatively wide transmission bandwidth. The resulting signals are converted to analog and upconverted to a carrier frequency by upconverter 118 for transmission by the transmit antenna 122. The resulting signal transmitted by the transmit antenna 122 is shown in FIG. 1 as the signal 123.

The signal 123 is received by the receive antenna 124 and applied to a RAKE receiver 156 which, in general, produces estimates 154 of the original data bits 104. In the RAKE receiver 156, the signal from the receive antenna is downconverted by the downconverter 126 to baseband and converted to in-phase (I) and quadrature (Q) digital signals. These signals are then applied to a despreader 132 where the excess bandwidth added by the spreader 114 in the transmitter 100 is removed. A RAKE receiver's despreading block generally consists of multiple stages operating in parallel as is well known in the art. These stages are called fingers and consist of a multiplier which forms the product of the input signal with the same pseudorandom sequences used in spreading. An accumulator sums the results of a number of these multiplies, outputs the result, and is then reset to zero. The pseudorandom sequences used in each of the fingers have different relative phases which correspond to estimated multipath delays. The output of the despreader 132 therefore generally consists of multiple outputs corresponding to each of the finger's estimate of the transmitted signal 123. The preferred embodiment is described below for the case of a single output finger, although the invention applies equally well with multiple fingers.

Continuing, the in-phase (I) and quadrature (Q) signals output from the despreader 132 are next applied to a frequency correction block 136 where, based on a frequency offset estimate 145, any remaining frequency offset is removed. The resulting in-phase (I) digital signals exiting the frequency correction block 136 are grouped into vectors (called "I" vectors) of length 64 with output samples one through 64 forming the 64 elements of the first vector, output samples 65 through 128 forming the 64 elements of the second vector, and so on. The resulting vectors are then applied to the Fast Hadamard Transformer (FHT) 140. Similarly, the resulting quadrature (Q) digital signals exiting the frequency correction block 136 are also grouped into vectors (called "Q" vectors) of length 64 (as described above) and applied to the FHT 140.

The FHT 140 correlates these input "I" vectors with the set of 64 possible Walsh functions to yield output vectors each of which have 64 elements by assigning the first correlation to the first element of the output vectors 142, the second correlation to the second element, and so on. The FHT 140 likewise correlates the input "Q" vectors with the set of 64 possible Walsh functions to yield output vectors each of which have 64 elements by assigning the first correlation to the first element of the quadrature output vectors 143, the second correlation to the second element, and so on. Outputs 142 and 143 are then applied to a Walsh symbol processor 144 whose output 146 consists of vectors of Walsh symbol metrics with each element associated with a possible transmitted Walsh function. Also output from the Walsh symbol processor 144 is a frequency offset estimate 145. The Walsh symbol processor 144 also has as input a signal 158 which enables the coherent mode (as will be described) and a signal 160 related to a threshold value. The signals 158 and 160 are generated by a controlling microprocessor 162. A conditional metric generator 148 having the vectors of Walsh symbol metrics 146 as inputs generates a second set of metrics 150 which are used by the convolutional decoder 152. The operation of the conditional metric generator is described in U.S. patent application Ser. No. 08/581,696 titled "Method and Apparatus for Decoding an Encoded Signal" filed 29 Dec. 1995 on behalf of Terry M. Schaffner, assigned to the assignee of the present application, and incorporated herein by reference. The convolutional decoder 152 then produces the estimate 154 of the original data bits 104.

Figure 2:
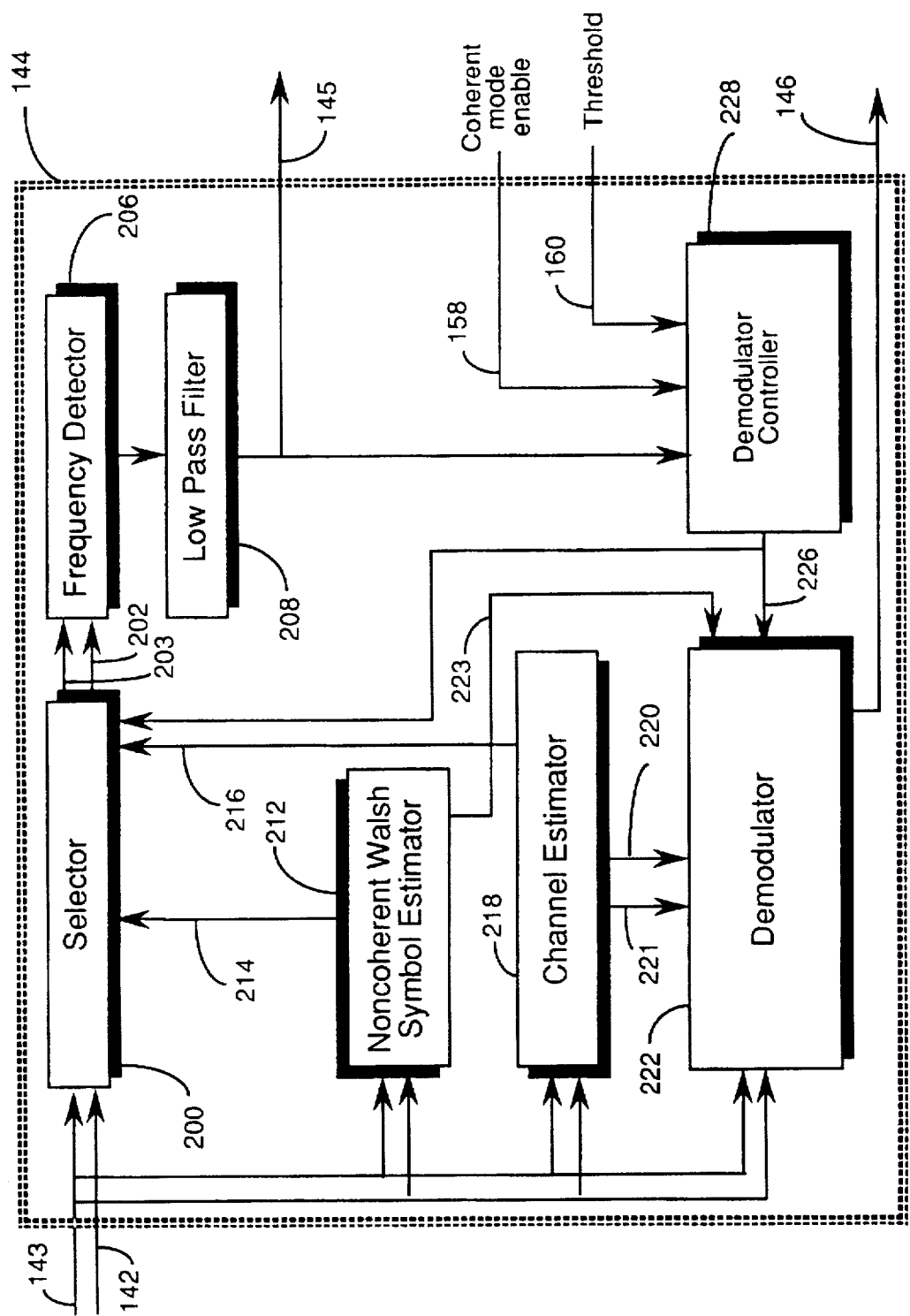
FIG. 2 generally depicts, in block diagram form, a Walsh symbol processor which may be beneficially utilized to implement demodulation in accordance with the invention.

FIG. 2 illustrates the functions performed by the Walsh symbol processor 144. The purpose of the Walsh symbol processor 144 is to take pairs of inputs of vectors of Walsh function correlations and from these generate output vectors of Walsh symbol metrics which are ultimately used to derive the bit metrics used by the convolutional decoder 152. The Walsh symbol processor 144 also generates a baseband frequency offset estimate 145 used by the frequency correction block 136.

Specifically, the I and Q output vectors 142 and 143 output from the FHT 140 are fed to four blocks within the Walsh symbol processor 144: a channel estimator 218, a Walsh symbol estimator 212, a selector 200, and a demodulator 222. In the preferred embodiment, the channel estimator 218 is that described in U.S. patent application Ser. No. 08/582,856 titled "Method and Apparatus for Coherent Channel Estimation" filed 4 Jan. 1996 on behalf of Ling et al., assigned to the assignee of the present application, and incorporated herein by reference. Those skilled in the art will realize however that other methods of channel estimation are likewise applicable. The channel estimator 218 produces I and Q channel estimates 220 and 221 respectively as well estimates of the transmitted Walsh functions 216. The I and Q channel estimates 220 and 221 are used by the demodulator 222 to perform coherent detection in accordance with the invention. For each pair of input vectors, the estimates of the transmitted Walsh functions 216 consists of an integer between 0 and 63 corresponding to the index of the transmitted Walsh symbol.

The noncoherent Walsh symbol estimator 212 similarly uses the I and Q output vectors 142 and 143 to generate a second set of Walsh symbol estimates 214 and 223. This is accomplished by squaring each component of the input I and Q vectors and adding the results component by component to obtain a Walsh symbol energy for each of the 64 possible Walsh functions. The largest of these energies is termed the winning Walsh symbol energy and the index of this winning Walsh symbol estimate appears as estimate 214. The noncoherent Walsh symbol estimator 212 also produces an estimate 223 of the energy received during a group of six Walsh symbols (called a power control group or PCG). This estimate 223 is simply the sum of the PCG's six winning Walsh symbol energies.

For each input I vector 142, the selector 200 selects one of 64 components to pass to the in-phase output 202 according to 216 or 214 as described below. Similarly, for each input Q vector 143, the selector selects one of 64 components to pass to the quadrature output 203. The element which is passed in both cases is determined by the detection mode select signal 226 of the demodulation controller 228. A detection select output of "1" on detection mode select signal 226 indicates that signal 216 is to be used as the index of the components to pass, while a "0" on detection mode select signal 226 indicates that output 214 is to be used as the index of the components to pass. As will be described below, the detection mode select signal 226 indicates whether coherent or noncoherent detection will be used, a "1" indicating coherent detection. The detection mode select signal 226 is also used to indicate which source of Walsh symbol estimates are most reliable.

Under relatively stable channel conditions, the detection mode select signal 226 is "1" thus indicating coherent detection is selected. In this case, the Walsh symbol estimates 216 provided by the channel estimator 218 are more accurate than the estimates 214 generated by the noncoherent Walsh symbol estimator 212. Conversely, noncoherent demodulation performs best under rapidly varying channels, and under these conditions, the Walsh symbol estimates 214 generated from the noncoherent Walsh symbol estimator 212 are more accurate and are selected by virtue of the detection mode select signal 226 being set to "0".

Continuing, the frequency detector 206 uses the input signals 202 and 203 to generate a signal which is low pass filtered by the low pass filter 208, eventually generating the baseband frequency offset estimate 145. The demodulator controller 228 uses the frequency offset estimate 145, along with the coherent mode enable control 158 and the frequency error threshold signal 160, to generate the detection mode select signal 226 as described below. With the I and Q vectors 142 and 143 as input, the demodulator 222 performs demodulation to generate the Walsh symbol metrics 146 based on the channel estimates 220 and 221 and the detection mode select signal 226.

Figure 3:
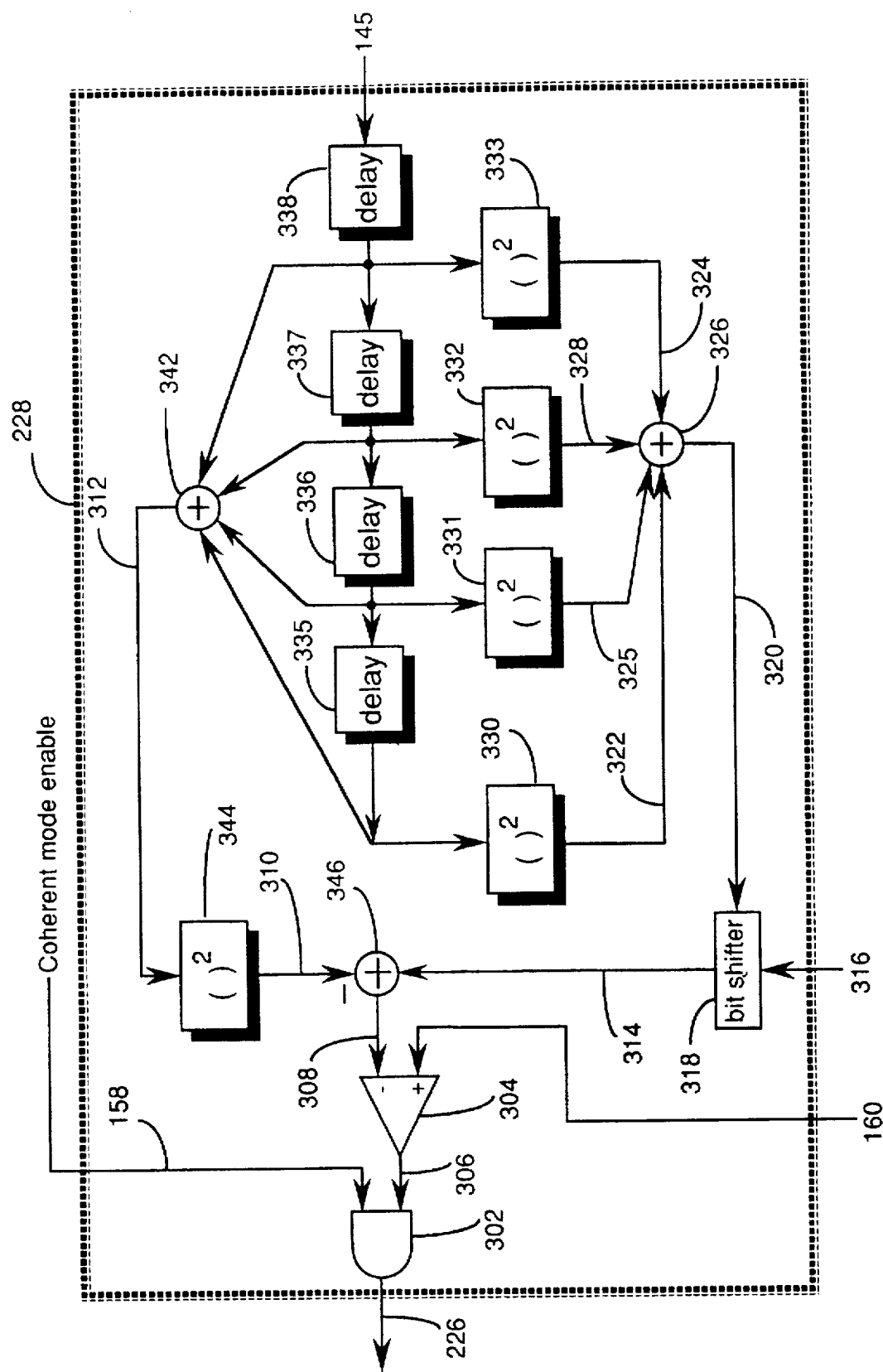
FIG. 3 generally depicts, in block diagram form, a demodulator controller used to implement demodulation in accordance with the invention.

FIG. 3 generally describes the demodulation controller 228 used to provide the detection mode select signal 226 in accordance with the invention. The demodulation controller 228 has as input the baseband frequency offset estimate 145 and the control signals 158 and 160, and generates the detection mode select signal 226 which controls both the demodulator 222 and the selector 200 in accordance with the invention. Specifically, the baseband frequency offset estimate 145 is fed to a series of $2^L$ delays 335–338. The output of the delays 335–338 are summed at the summing node 342 to produce the signal 312, which is then squared by a squarer 344. The output of the delays 335–338 are also input to squaring circuits 330–333. The outputs of squaring circuits 330–333 are summed at the summing node 326, and the summed result 320 sent to a bit shifter 318. The bit shifter 318 performs a multiplication by a factor of $2^L$ by shifting the binary representation of the summed result 320 L bits and adding L zeros in the least significant L bits to form signal 314. The signal 310 output from the squarer 344 is subtracted from the signal 314 output from the bit shifter 316 at the summing node 346. The resulting signal estimate 308 represents a scaled version of an estimate of the mean squared offset frequency.

The resulting signal estimate 308 is then compared in the comparator 304 to the frequency error threshold signal 160 determined by the controlling microprocessor 162. If the signal estimate 308 is less than the frequency error threshold signal 160, the comparator output 306 is a "1", otherwise it is "0". With the appropriate choice of frequency error threshold signal 160 therefore, detection can automatically be switched from noncoherent to coherent as the signal estimate 308 becomes small (a small signal estimate 308 implies a good channel estimate, which implies coherent detection). Finally, the AND gate 302 performs the logical "AND" of the coherent mode enable 158 and the comparator output 306. The detection mode select signal 226 is therefore "1" only when both the coherent mode enable signal 158 and the comparator output 306 are "1". Note that in this scheme the controlling microprocessor 162 can set the detection mode select signal 226 (and therefore the type of detection—either coherent or noncoherent) independent of the frequency estimates appearing at 145 simply by setting the frequency error threshold signal 160 to be sufficiently high so that comparator output 306 is always a "1". The controlling microprocessor 162 can therefore also control the detection selection based on information related to the state of the radio channel 159. An example might be changing the type of detection based on an elapsed time since call initiation or occurrence of handoff in the wireless communication system.

Figure 4:
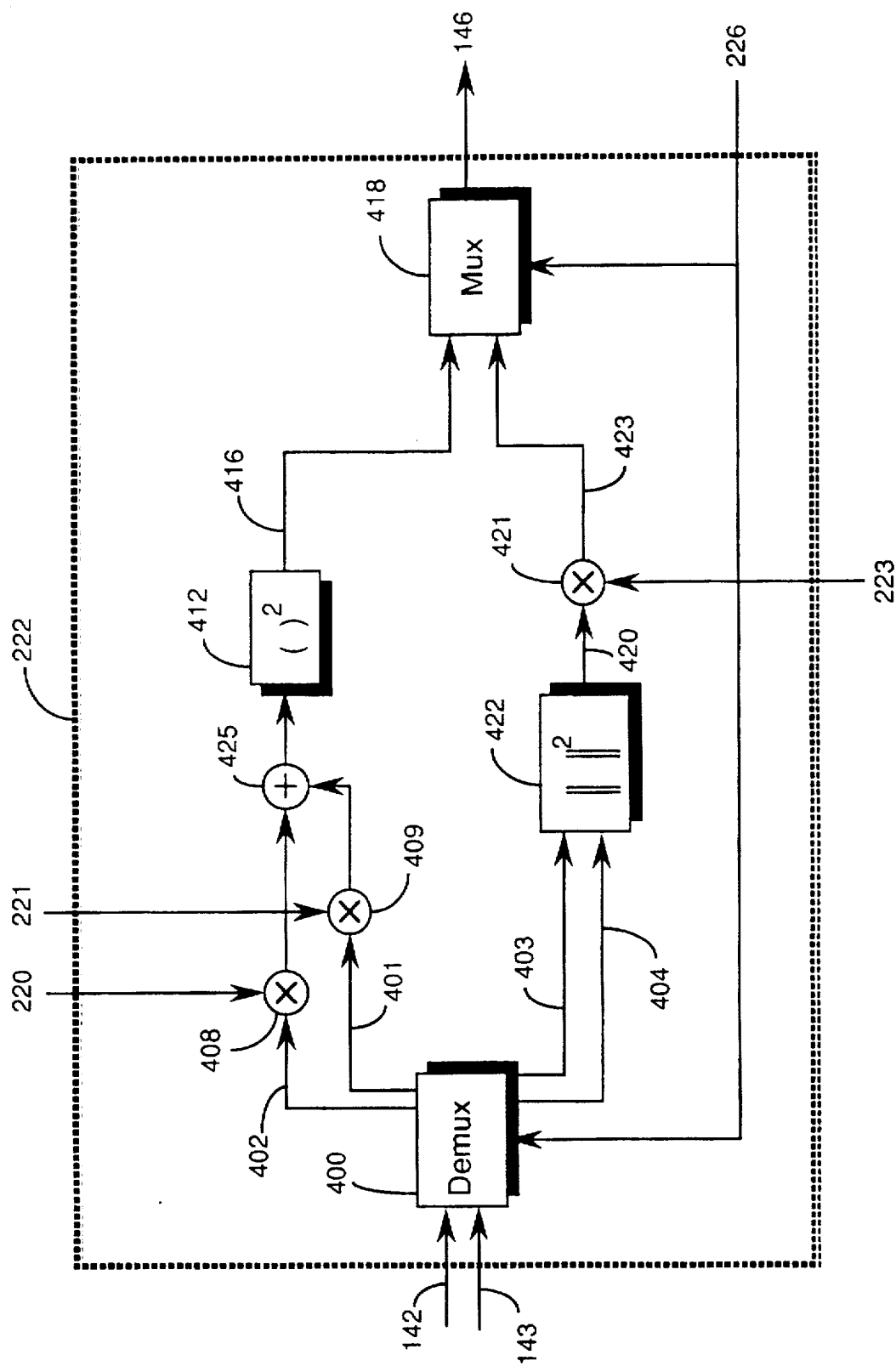
FIG. 4 generally depicts, in block diagram form, a demodulator including a coherent and noncoherent path in accordance with the invention.

FIG. 4 generally depicts a demodulator 222 which generates Walsh symbol metrics through either coherent or noncoherent detection in accordance with the invention. The determination of whether coherent or noncoherent detection is implemented is based on the state of the detection mode select signal 226. The sequence of vectors 142 and 143 are transferred by the demultiplexer 400 to either a pair of multipliers 408 and 409 or to a squaring circuit 422. If the detection mode select signal 226 is set to "1", then signals 142 and 143 are routed to outputs 402 and 401 respectively where coherent demodulation is performed. Otherwise signals 142 and 143 are routed to outputs 404 and 403 respectively where noncoherent detection is performed.

Coherent detection is accomplished by multipliers 408 and 409 as described in U.S. patent application Ser. No. 08/581,696 cited above. Briefly, the components of the in-phase (I) input vector 402 are multiplied by the I component of the channel estimate 220 and the components of the quadrature (Q) input vector 401 are multiplied by the Q component of the channel estimate 221. These two vectors are then summed component by component in the summing node 425. The components of the result are squared in block 412 yielding output vectors 416 of length 64 with the ith element representing the metric or level of confidence that the lth Walsh symbol was transmitted.

If the detection mode select signal 226 is set to "0", then the then signals 142 and 143 are routed to outputs 403 and 404 respectively. In this case, the squarer 422 performs noncoherent detection by squaring the components of the input vectors 403 and 404 respectively and summing. This operation may be described as follows. Let the lth component of the I vector at 404 be denoted $x_{404}(l)$ and let the lth component of the Q vector at 403 be denoted as $x_{403}(l)$. Then the lth component of the vector appearing at 420, $y_{420}(l)$, is $$y_{320}(l) = x_{304}^2(l) + x_{303}^2(l).$$

Each of the components at 420 are then applied to a multiplier 421 which weights these values by that Walsh symbol's PCG energy 223 obtained from the noncoherent Walsh symbol estimator 212. The multiplexer 418 passes the noncoherently detected signal 423 through to the demodulator output 146 when a "0" appears on the detection mode select signal 226.

Since the preferred embodiment of the inventive apparatus and method is a digital mobile radiotelephone system, changes in the radio channel are not unusual. In addition the radio channel can change to a state where coherent detection yields high bit error rates. This problem is addressed by switching between noncoherent and coherent detection based on an estimate of the radio channel's state or upon the command of an external processor which may estimate the state of the channel based on its knowledge of radio link activity. As such, the receiver 156 of FIG. 1 in accordance with the invention therefore takes advantage of the superior bit error rate performance of coherent detection when the radio channel is relatively stable and yet does not suffer from the severe performance degradation associated with this detection scheme in more rapidly varying radio channels since noncoherent detection is then implemented.

Figure 5:
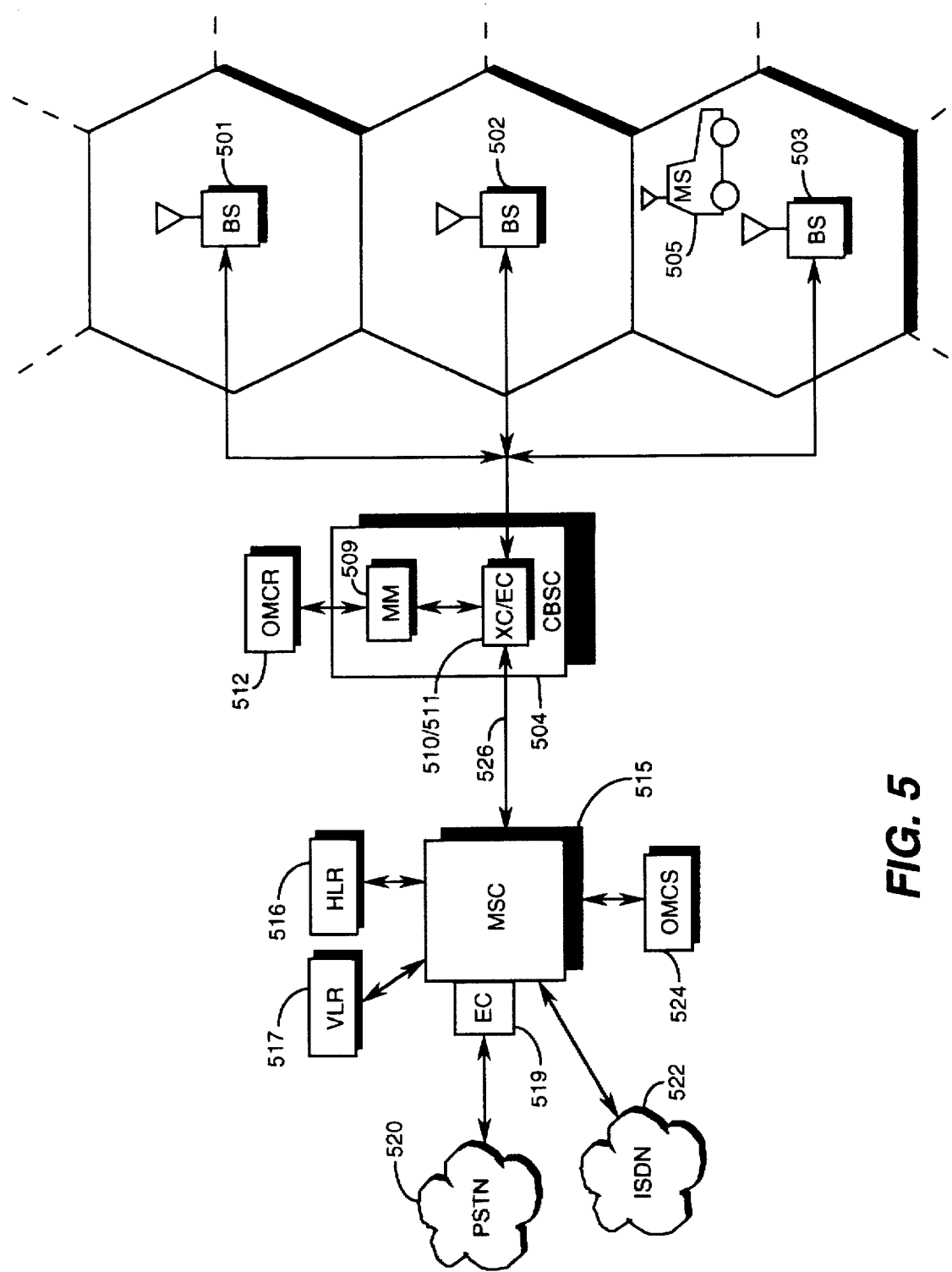
FIG. 5 generally depicts, in block diagram form, a wireless communication system which may benefit from demodulation in accordance with the invention.

FIG. 5 generally depicts a block diagram of a communication system 500 which may beneficially implement demodulation in accordance with the invention. In the preferred embodiment, the communication system is a code division multiple access (CDMA) cellular radiotelephone system. As one of ordinary skill in the art will appreciate, however, demodulation in accordance with the invention can be implemented in any communication system which would benefit from the system.

Referring to FIG. 5, acronyms are used for convenience. The following is a list of definitions for the acronyms used in FIG. 5:

| BS | Base-Station |
| CBSC | Centralized Base-Station Controller |
| EC | Echo Canceller |
| VLR | Visitor Location Register |
| HLR | Home Location Register |
| ISDN | Integrated Services Digital Network |
| MS | Mobile Station |
| MSC | Mobile Switching Center |
| MM | Mobility Manager |
| OMCR | Operations and Maintenance Center-Radio |
| OMCS | Operations and Maintenance Center-Switch |
| PSTN | Public Switched Telephone Network |
| XC | Transcoder |

As seen in FIG. 5, a plurality of BTSs 501–503 are coupled to a CBSC 504. Each BTS 501–503 provides radio frequency (RF) communication to an MS 505. In the preferred embodiment, the transmitter 100 and receiver 156 depicted in FIG. 1 are implemented in the BTSs 501–503 and the MS 505 to support the RF communication as defined in the aforementioned TIA/EIA/IS-95, *Mobile Station-Basestation Compatibility Standard for Dual Mode Wideband Spread Spectrum Cellular System*, July 1993 available from the Telecommunication Industry Association (TIA). The CBSC 504 is responsible for, inter alia, call processing via the XC 510 and mobility management via the MM 509. Other tasks of the CBSC 504 include feature control and transmission/networking interfacing. For more information on the functionality of the CBSC 504, reference is made to U.S. Pat. No. 5,475,686 to Bach et al., assigned to the assignee of the present application, and incorporated herein by reference.

Also depicted in FIG. 5 is an OMCR 512 coupled to the MM 509 of the CBSC 504. The OMCR 512 is responsible for the operations and general maintenance of the radio portion (CBSC 504 and BTSs 501–503) of the communication system 500. The CBSC 504 is coupled to an MSC 515 which provides switching capability between the PSTN 520/ISDN 522 and the CBSC 504. The OMCS 524 is responsible for the operations and general maintenance of the switching portion (MSC 515) of the communication system 500. The HLR 516 and VLR 517 provide the communication system 500 with user information primarily used for billing purposes. ECs 511 and 519 are implemented to improve the quality of the speech signal transferred through the communication system 500.

The functionality of the CBSC 504, MSC 515, HLR 516 and VLR 517 is shown in FIG. 5 as distributed, however one of ordinary skill in the art will appreciate that the functionality could likewise be centralized into a single element. Also, for different configurations, the XC 510 could likewise be located at either the MSC 515 or a BTS 501–503.

The link 526 coupling the MSC 515 with the CBSC 504 is a T1/E1 link which is well known in the art. By placing the XC 510 at the CBSC, a 4:1 improvement in link budget is realized due to compression of the input signal (input from the T1/E1 link 526) by the XC 510. The compressed signal is transferred to a particular BTS 501–503 for transmission to the MS 505. Important to note is that the compressed signal transferred to a particular BTS 501–503 undergoes further processing at the BTS 501–503 before transmission occurs. Stated differently, the eventual signal transmitted to the MS 505 is different in form but the same in substance as the compressed signal exiting the XC 510.

When the MS 505 receives the signal transmitted by a BTS 501–503, the MS 505 will essentially "undo" (commonly referred to as "decode") all of the processing performed at the BTS 501–503 and the speech coding performed by the XC 510. When the MS 505 transmits a signal back to a BTS 501–503, the MS 505 likewise implements speech coding. After a signal is transmitted by the MS 505 (the MS also performs further processing of the signal to change the form, but not the substance, of the signal) to a BTS 501–503, the BTS 501–503 will "undo" the processing performed on the signal and transfer the resulting signal to the XC 510 for speech decoding. After speech decoding by the XC 510, the signal is transferred to an end user via the T1/E1 link 526.

Accordingly, it is intended that the invention not be limited by the foregoing description of embodiments, but to embrace all such alterations, modifications, and variations in accordance with the spirit and scope of the appended claims. While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. An apparatus for demodulating a modulated signal, the apparatus comprising:
   a coherent demodulator having as input a version of the modulated signal;
   a noncoherent demodulator having as input the version of the modulated signal; and
   a selector for selecting between the coherent demodulator and the noncoherent demodulator based on the status of a detection mode select signal.

2. The apparatus of claim 1, wherein the modulated signal further comprises an orthogonally modulated signal.

3. The apparatus of claim 2, wherein the version of the modulated signal further comprises an in-phase (I) component and a quadrature (Q) component of the orthogonally modulated signal.

4. The apparatus of claim 1, wherein the status of the detection mode select signal is generated by comparing an estimate of a frequency offset to a threshold.

5. The apparatus of claim 1, wherein the apparatus is employed in a receiver compatible with a code division multiple access (CDMA) wireless communication system.

6. An apparatus for demodulating an orthogonally modulated signal, the apparatus comprising:
   a coherent demodulator having as input an in-phase (I) component and a quadrature (Q) component of the orthogonally modulated signal;
   a noncoherent demodulator having as input the in-phase (I) component and the quadrature (Q) component of the orthogonally modulated signal; and
   a selector having as an output a detection mode select signal to select which of the coherent demodulator or the noncoherent demodulator to employ.

7. The apparatus of claim 6, wherein the detection mode select signal is generated by comparing an estimate of a variance of the frequency offset to a threshold.

8. The apparatus of claim 7, wherein the estimate of the variance of the frequency offset is generated utilizing:
   a plurality of delay elements for delaying a baseband frequency offset estimate;
   a first summing node for summing an output of each of the plurality of delay elements to produce a first summing node output signal;
   a squarer for squaring the summed output signal to produce a squared summed output signal;
   a plurality of squarers for squaring each of the outputs of the plurality of delay elements to produce a plurality of squared outputs;
   a second summing node for summing the plurality of squared outputs of the plurality of squarers to produce a second summing node output signal;
   a bit shifter for shifting the second summing node output signal by a predetermined number of bits to produce a bit-shifted signal; and
   a third summing node implemented so that the squared summed output signal is subtracted from the bit-shifted signal to produce the estimate of the frequency offset.

9. The apparatus of claim 7, wherein the threshold is controlled by a microprocessor.

10. The apparatus of claim 9, wherein the microprocessor controls the selection of either the coherent demodulator or the noncoherent demodulator based on information related to the state of the radio channel.

11. The apparatus of claim 10, wherein the state of the radio channel further comprises an elapsed time after a communication initiation or an occurrence of a communication handoff.

12. A method of demodulating a modulated signal in a wireless communication system, the method comprising the steps of:
   generating a first estimate of the modulated signal;
   generating a second estimate of the modulated signal;
   comparing the first and second estimates to determine a confidence indication related to the accuracy of the estimates;
   generating a detection mode select signal utilizing either the first estimate or the second estimate based on the confidence indication; and
   selecting either a coherent demodulator or a noncoherent demodulator to employ based on the generated detection mode select signal.

13. The method of claim 12, wherein the first estimate of the modulated signal is generated by a coherent channel estimator.

14. The method of claim 12, wherein the second estimate of the modulated signal is generated by a noncoherent Walsh symbol estimator.

* * * * *